US012300783B2

(12) United States Patent
Yokoji

(10) Patent No.: US 12,300,783 B2
(45) Date of Patent: May 13, 2025

(54) SECONDARY BATTERY

(71) Applicant: MURATA MANUFACTURING CO., LTD., Kyoto (JP)

(72) Inventor: Takato Yokoji, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 630 days.

(21) Appl. No.: 17/533,426

(22) Filed: Nov. 23, 2021

(65) Prior Publication Data

US 2022/0085411 A1 Mar. 17, 2022

Related U.S. Application Data

(63) Continuation of application No. PCT/JP2020/021387, filed on May 29, 2020.

(30) Foreign Application Priority Data

May 31, 2019 (JP) ................................. 2019-102903

(51) Int. Cl.
*H01M 10/0565* (2010.01)
*H01M 4/136* (2010.01)
(Continued)

(52) U.S. Cl.
CPC ....... *H01M 10/0565* (2013.01); *H01M 4/136* (2013.01); *H01M 4/366* (2013.01);
(Continued)

(58) Field of Classification Search
CPC ......... H01M 10/0565; H01M 10/0587; H01M 50/105; H01M 4/136; H01M 4/366; H01M 4/485; H01M 2220/30
See application file for complete search history.

(56) References Cited

U.S. PATENT DOCUMENTS

2013/0054061 A1* 2/2013 Nishimoto .......... H01M 50/446
429/246
2014/0178727 A1* 6/2014 Kwon ................. H01M 10/058
429/94
(Continued)

FOREIGN PATENT DOCUMENTS

JP    H11130821 A  *  5/1999  ............ C08F 214/22
JP    2004158307 A      6/2004
(Continued)

OTHER PUBLICATIONS

JPH11130821A English machine translation (Year: 2024).*
International Search Report for Application No. PCT/JP2020/021387, dated Sep. 1, 2020.

*Primary Examiner* — Armindo Carvalho, Jr.
(74) *Attorney, Agent, or Firm* — K&L Gates LLP

(57) ABSTRACT

A battery comprises a positive electrode, a negative electrode and an electrolyte layer, in which the electrolyte layer has at least a peripheral portion provided along edges on a pair of non-short sides opposite to each other and a non-peripheral portion provided by a portion separated from the peripheral portion; the peripheral portion includes an electrolyte solution, a polymer compound holding the electrolyte solution, and inorganic particles in a first composition; the non-peripheral portion includes an electrolyte solution, a polymer compound, and inorganic particles in a second composition.

18 Claims, 5 Drawing Sheets

(51) Int. Cl.
- *H01M 4/36* (2006.01)
- *H01M 4/485* (2010.01)
- *H01M 10/0587* (2010.01)
- *H01M 50/105* (2021.01)

(52) U.S. Cl.
CPC ....... *H01M 4/485* (2013.01); *H01M 10/0587* (2013.01); *H01M 50/105* (2021.01); *H01M 2220/30* (2013.01)

(56) References Cited

U.S. PATENT DOCUMENTS

| | | |
|---|---|---|
| 2018/0090794 A1 | 3/2018 | Amasaki et al. |
| 2018/0159103 A1 | 6/2018 | Naoe et al. |
| 2018/0277897 A1 | 9/2018 | Sugita et al. |

FOREIGN PATENT DOCUMENTS

| | | |
|---|---|---|
| JP | 2012074367 A | 4/2012 |
| JP | 2018055871 A | 4/2018 |
| JP | 2018092830 A | 6/2018 |
| WO | 2017094396 A1 | 6/2017 |

\* cited by examiner

SECONDARY BATTERY

CROSS REFERENCE TO RELATED APPLICATIONS

The present application is a continuation of PCT patent application no. PCT/JP2020/021387, filed on May 29, 2020, which claims priority to Japanese patent application no. JP2019-102903 filed on May 31, 2019, the entire contents of which are being incorporated herein by reference.

BACKGROUND

The present disclosure relates to a secondary battery.

Secondary batteries are used as power supply sources for electronic devices used in various industrial fields such as the automobile industry. As the secondary battery, a non-aqueous electrolyte secondary battery that is excellent in high energy density and high power density, for example, a lithium-ion secondary battery, attracts attention. There is known the non-aqueous electrolyte secondary battery having a laminated structure of a positive electrode, a negative electrode, and an electrolyte layer including an electrolyte solution in terms of the structure thereof.

The electrolyte layer of the non-aqueous electrolyte secondary battery includes an electrolyte solution and a polymer compound that holds the electrolyte solution. The secondary battery having such an electrolyte layer is problematic in that an electrolyte solution leaks outside the electrolyte layer to cause a short circuit inside the battery.

SUMMARY

The present disclosure relates to a secondary battery.

In the conventional secondary battery, a battery member such as a sealing resin is added in order to suppress the leakage of the electrolyte solution from a portion holding the electrolyte solution such as an electrolyte layer, and thus has a problem of lowering the energy density of the battery.

An object of the present disclosure is to provide a secondary battery capable of suppressing leakage of an electrolyte solution from an electrolyte layer without adding a new battery member.

According to an embodiment of the present disclosure, a battery is provided. The battery includes a positive electrode, a negative electrode, and an electrolyte layer, and the electrolyte layer having at least a peripheral portion provided along edges on a pair of non-short sides opposite to each other and a non-peripheral portion provided by a portion deviated from the peripheral portion, the peripheral portion including an electrolyte solution, a polymer compound holding the electrolyte solution, and inorganic particles in a first composition, the non-peripheral portion including an electrolyte solution, a polymer compound, and inorganic particles in a second composition, and the first composition and the second composition satisfying at least one of the following conditions 1 or 2, where a mass ratio of the electrolyte solution to the polymer compound in the first composition is defined as Aout, a mass ratio of the inorganic particles to the polymer compound is defined as Bout, a mass ratio of the electrolyte solution to the polymer compound in the second composition is defined as Ain, and a mass ratio of the inorganic particles to the polymer compound is defined as Bin.

Condition 1: a ratio of Ain to Aout is more than 1.
Condition 2: a ratio of Bin to Bout is less than 1.

The present disclosure can provide a battery capable of suppressing leakage of an electrolyte solution from an electrolyte layer without adding a new battery member.

The effects described in the present specification are merely exemplary and are not limited, and there may be additional effects.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
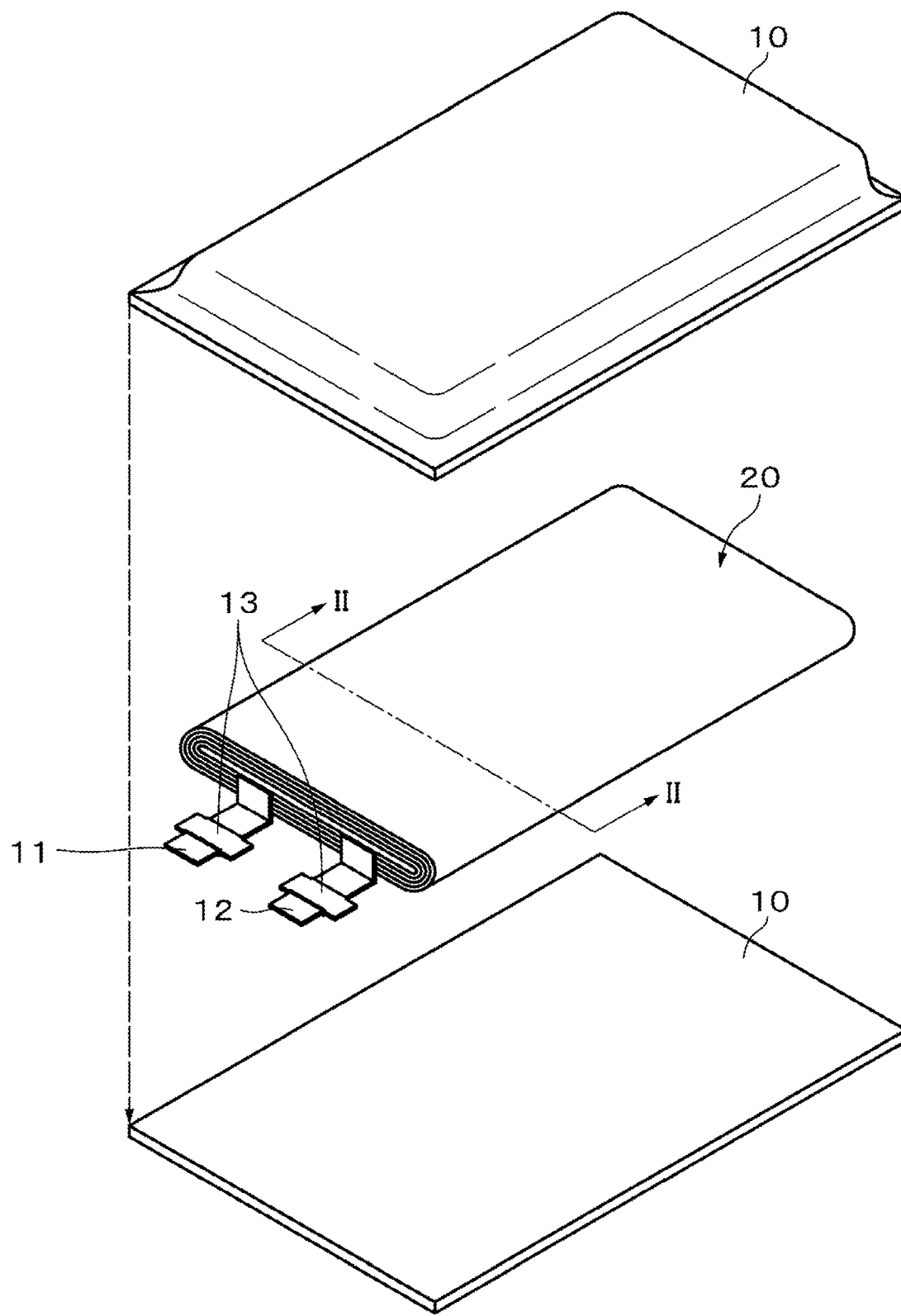
FIG. 1 is an exploded perspective view showing an example of a configuration of a non-aqueous electrolyte secondary battery according to an embodiment of the present disclosure.

FIG. 1 shows an example of a configuration of a non-aqueous electrolyte secondary battery (hereinafter, simply referred to as a "battery") according to an embodiment of the present disclosure. The battery is a so-called laminated battery, and includes: wound electrode assembly 20 with positive electrode lead 11 and negative electrode lead 12 attached thereto; and film-shaped exterior material 10 that accommodates this electrode assembly 20, and can be reduced in size, weight, and thickness.

Positive electrode lead 11 and negative electrode lead 12 are led out from the inside to the outside of exterior material 10, for example, in the same direction. Each of positive electrode lead 11 and negative electrode lead 12 is composed of, for example, a metal material such as Al, Cu, Ni, or stainless steel, and has a thin plate shape or a mesh shape.

Exterior material 10 may include, for example, a rectangular aluminum laminate film obtained by bonding a nylon film, an aluminum foil, and a polyethylene film in this order. For example, the exterior material 10 is disposed such that the polyethylene film side and electrode assembly 20 face each other, and outer edge portions thereof are in close contact with each other by fusion or an adhesive. Adhesive film 13 for suppressing entry of outside air is inserted between exterior material 10, positive electrode lead 11, and negative electrode lead 12. Adhesive film 13 is composed of a material having adhesion to positive electrode lead 11 and negative electrode lead 12, for example, a polyolefin resin such as polyethylene, polypropylene, modified polyethylene, or modified polypropylene.

The exterior material 10 may also include a laminate film having another structure, a polymer film such as polypropylene, or a metal film, instead of the aluminum laminate film described above. Alternatively, the exterior material 10 may be composed of a laminate film in which a polymer film is laminated on one surface or both surfaces of an aluminum film as a core material.

Figure 2:
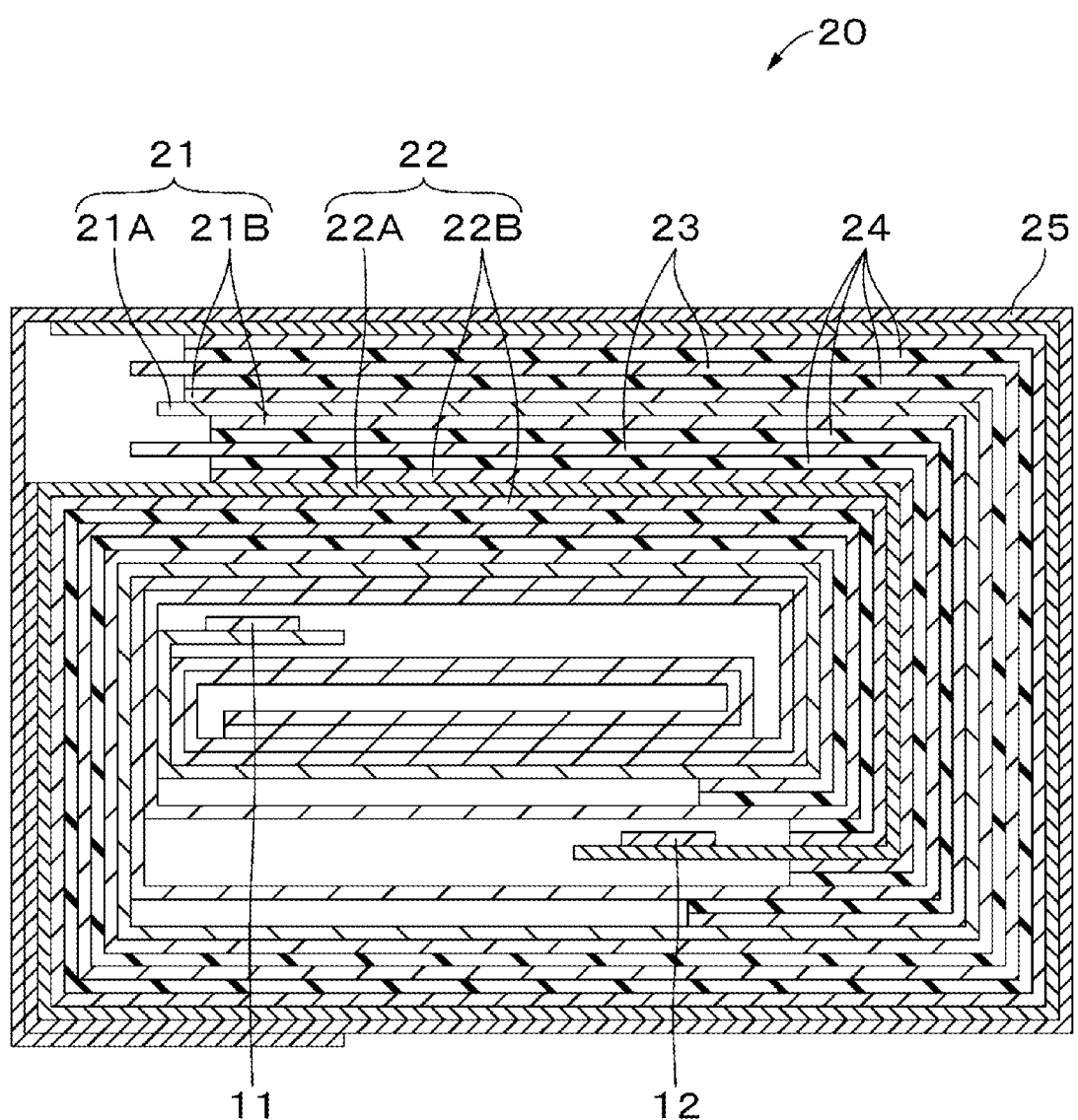
FIG. 2 is a sectional view taken along line II-II in FIG. 1.

FIG. 2 is a sectional view taken along line II-II of electrode assembly 20 shown in FIG. 1. The electrode assembly 20 includes positive electrode 21 having an elongated shape, negative electrode 22 having an elongated shape, separator 23 provided between the positive electrode 21 and the negative electrode 22 and having an elongated shape, and electrolyte layer 24 provided between the positive electrode 21 and the separator 23 and between the negative electrode 22 and the separator 23. The electrode assembly 20 has a configuration in which positive electrode 21 and negative electrode 22 are laminated through separator 23 and electrolyte layer 24 interposed therebetween and wound in a longitudinal direction so as to be flat and spiral, and the outermost peripheral portion is protected by protective tape 25.

Hereinafter, the positive electrode 21, the negative electrode 22, the separator 23, and the electrolyte layer 24 constituting the battery will be sequentially described.

The positive electrode 21 includes, for example, positive electrode current collector 21A and positive electrode active material layer 21B provided on both sides of the positive electrode current collector 21A. The positive electrode current collector 21A is composed of, for example, a metal foil such as an aluminum foil, a nickel foil, or a stainless-steel foil. The positive electrode active material layer 21B includes one or more positive electrode active materials capable of occluding and releasing lithium. The positive electrode active material layer 21B may further include at least one of a binder and a conductive agent as necessary.

Suitable examples of the positive electrode active material include a lithium-containing compound such as a lithium oxide, a lithium phosphorus oxide, a lithium sulfide, or an interlayer compound including lithium, and two or more thereof may be mixed and used. A lithium-containing compound including lithium, a transition metal element, and oxygen is preferable for increasing the energy density. Examples of such a lithium-containing compound include a lithium composite oxide having a layered rock-salt structure shown in formula (A), and a lithium composite phosphate having an olivine structure shown in formula (B). The lithium-containing compound more preferably includes at least one selected from the group consisting of Co, Ni, Mn, and Fe as a transition metal element. Examples of such a lithium-containing compound include: a lithium composite oxide having a layered rock-salt structure represented by formula (C), formula (D), or formula (E); a lithium composite oxide having a spinel structure represented by formula (F); and a lithium composite phosphate having an olivine structure represented by formula (G), and specifically include $LiNi_{0.50}Co_{0.20}Mn_{0.30}O_2$, $LiCoO_2$, $LiNiO_2$, $LiNiaCo_{1-a}O_2$ (0<a<1), $LiMn_2O_4$, and $LiFePO_4$.

$$Li_pNi_{(1-q-r)}Mn_qM1_rO_{(2-y)}X_z \quad (A)$$

In the formula (A), M1 represents at least one element selected from group 2 to group 15 excluding Ni and Mn. X represents at least one selected from the group consisting of group 16 elements and group 17 elements other than oxygen. p, q, y, and z are values within the ranges of 0≤p≤1.5, 0≤q≤1.0, 0≤r≤1.0, −0.10≤y≤0.20, and 0≤z≤0.2.

$$Li_aM2_bPO_4 \quad (B)$$

In the formula (B), M2 represents at least one element selected from group 2 to group 15. a and b are values within the ranges of 0≤a≤2.0 and 0.5≤b≤2.0.

$$Li_fMn_{(1-g-h)}Ni_gM3_hO_{(2-j)}F_k \quad (C)$$

In the formula (C), M3 represents at least one selected from the group consisting of Co, Mg, Al, B, Ti, V, Cr, Fe, Cu, Zn, Zr, Mo, Sn, Ca, Sr, and W. f, g, h, j, and k are values within the ranges of 0.8≤f≤1.2, 0<g<0.5, 0≤h≤0.5, g+h<1, −0.1≤j≤0.2, and 0≤k≤0.1. The composition of lithium varies depending on the condition of charge and discharge, and the value of f represents a value in a fully discharged condition.

$$Li_mNi_{(1-n)}M4_nO_{(2-p)}F_q \quad (D)$$

In the formula (D), M4 represents at least one selected from the group consisting of Co, Mn, Mg, Al, B, Ti, V, Cr, Fe, Cu, Zn, Mo, Sn, Ca, Sr, and W. m, n, p, and q are values within the ranges of 0.8≤m≤1.2, 0.005≤n≤0.5, −0.1≤p≤0.2, and 0≤q≤0.1. The composition of lithium varies depending on the condition of charge and discharge, and the value of m represents a value in a fully discharged condition.

$$Li_rCo_{(1-s)}M5_sO_{(2-t)}F_u \quad (E)$$

In the formula (E), M5 represents at least one selected from the group consisting of Ni, Mn, Mg, Al, B, Ti, V, Cr, Fe, Cu, Zn, Mo, Sn, Ca, Sr, and W. r, s, t, and u are values within the ranges of 0.8≤r≤1.2, 0≤s<0.5, −0.1≤t≤0.2, and 0≤u≤0.1. The composition of lithium varies depending on the condition of charge and discharge, and the value of r represents a value in a fully discharged condition.

$$Li_vMn_{2-w}M6_wO_xF_y \quad (F)$$

In the formula (F), M6 represents at least one selected from the group consisting of Co, Ni, Mg, Al, B, Ti, V, Cr, Fe, Cu, Zn, Mo, Sn, Ca, Sr, and W. v, w, x, and y are values within the ranges of 0.9≤v≤1.1, 0≤w≤0.6, 3.7≤x≤4.1, and 0≤y≤0.1. The composition of lithium varies depending on the condition of charge and discharge, and the value of v represents a value in a fully discharged condition.

$$Li_zM7PO_4 \quad (G)$$

In the formula (G), M7 represents at least one selected from the group consisting of Co, Mg, Fe, Ni, Mg, Al, B, Ti, V, Nb, Cu, Zn, Mo, Ca, Sr, W, and Zr. z is a value within a range of 0.9≤z≤1.1. The composition of lithium varies depending on the condition of charge and discharge, and the value of z represents a value in a fully discharged condition.

In addition to these, an inorganic compound including no lithium, such as $MnO_2$, $V_2O_5$, $V_6O_{13}$, NiS, or MoS, can also be used as the positive electrode active material capable of occluding and releasing lithium.

The positive electrode active material capable of occluding and releasing lithium may be other than those described above. In addition, the positive electrode active materials exemplified above may be mixed in any combination of two or more.

As the binder, there can be used at least one selected from the group consisting of, for example, polyvinylidene fluoride, polytetrafluoroethylene, polyacrylonitrile, styrene butadiene rubber, carboxymethyl cellulose, and a copolymer mainly including one of these resin materials.

As the conductive agent, there can be used at least one carbon material selected from the group consisting of, for example, graphite, carbon fiber, carbon black, acetylene black, Ketjen black, carbon nanotube, and graphene. The conductive agent may be any material having conductivity, and is not limited to a carbon material. For example, a metal material and a conductive polymer material may be used as the conductive agent. In addition, examples of the shape of the conductive agent include a granular shape, a scaly shape, a hollow shape, a needle shape, and a cylindrical shape, and are not particularly limited to these shapes.

The negative electrode 22 includes, for example, negative electrode current collector 22A and negative electrode active material layer 22 B provided on both sides of the negative electrode current collector 22A. The negative electrode current collector 22A is composed of, for example, a metal foil such as a copper foil, a nickel foil, or a stainless-steel foil. The negative electrode active material layer 22B includes one or more of negative electrode active materials capable of occluding and releasing lithium. The negative electrode active material layer 22B may further include at least one of a binder and a conductive agent as necessary.

In this battery, it is preferable that the electrochemical equivalent of the negative electrode 22 or the negative electrode active material is larger than the electrochemical equivalent of the positive electrode 21, and theoretically, lithium metal is not deposited on the negative electrode 22 during charging.

Examples of the negative active material include carbon materials such as non-graphitizable carbon, graphitizable carbon, graphite, pyrolytic carbons, cokes, glassy carbons, organic polymer compound fired bodies, carbon fibers, or activated carbon. Of these, examples of the cokes include pitch coke, needle coke, or petroleum coke. The organic polymer compound fired body refers to a carbonized product obtained by firing a polymer material such as a phenol resin or a furan resin at an appropriate temperature, and some are classified as non-graphitizable carbon or graphitizable carbon. These carbon materials are preferable because the change in the crystal structure generated during charge and discharge is significantly small, a high charge and discharge capacity can be obtained, and good cycle characteristics can be obtained. Particularly, graphite is preferable because the electrochemical equivalent is large and a high energy density can be obtained. In addition, non-graphitizable carbon is preferable because excellent cycle characteristics can be obtained. Furthermore, those having a low charge-and-discharge potential, specifically those having a charge-and-discharge potential close to that of lithium metal are preferable because high energy density of the battery can be easily achieved.

In addition, examples of other negative electrode active materials capable of increasing the capacity include materials including at least one of a metal element and a metalloid element as a constituent element (for example, an alloy, a compound, or a mixture). This is because a high energy density can be obtained by using such a material. Particularly, use of the carbon material in combination can more preferably provide a high energy density and excellent cycle characteristics. In the present disclosure, the alloy includes an alloy including one or more metal elements and one or more metalloid elements in addition to an alloy including two or more metal elements. In addition, a non-metallic element may be included. The structure may include a solid solution, a eutectic (eutectic mixture), an intermetallic compound, or a mixture of two or more thereof.

Examples of such a negative electrode active material include a metal element or a metalloid element capable of forming an alloy with lithium. Specific examples thereof include Mg, B, Al, Ti, Ga, In, Si, Ge, Sn, Pb, Bi, Cd, Ag, Zn, Hf, Zr, Y, Pd, and Pt. These may be crystalline or amorphous.

Examples of such a negative electrode active material include those including a metal element or a metalloid element of group 4B in the short periodic table as a constituent element, and of these, those including at least one of Si and Sn as a constituent element are preferable. This is because Si and Sn have a high ability to occlude and release lithium, and a high energy density can be obtained. Examples of such a negative electrode active material include: a simple substance, an alloy, or a compound of Si; a simple substance, an alloy or a compound of Sn; and a material having one or two or more thereof in at least a part thereof.

Examples of the alloy of Si include alloys including at least one selected from the group consisting of Sn, Ni, Cu, Fe, Co, Mn, Zn, In, Ag, Ti, Ge, Bi, Sb, Nb, Mo, Al, P, Ga, and Cr as the second constituent element other than Si. Examples of the alloy of Sn include alloys including at least one selected from the group consisting of Si, Ni, Cu, Fe, Co, Mn, Zn, In, Ag, Ti, Ge, Bi, Sb, Nb, Mo, Al, P, Ga, and Cr as the second constituent element other than Sn.

Examples of the compound of Sn or the compound of Si include compounds including O or C as a constituent element. These compounds may include the second constituent element described above.

Particularly, the Sn-based negative electrode active material preferably includes Co, Sn, and C as constituent elements, and has a low crystallinity or an amorphous structure.

Examples of other negative electrode active materials include metal oxides or polymer compounds capable of occluding and releasing lithium. Examples of the metal oxide include lithium titanium oxide including Li and Ti, such as lithium titanate ($Li_4Ti_5O_{12}$), iron oxide, ruthenium oxide, or molybdenum oxide. Examples of the polymer compound include polyacetylene, polyaniline, or polypyrrole.

The same binder as the positive active material layer 21B can be used as the binder.

The same conductive agent as the positive electrode active material layer 21B can be used as the conductive agent.

Separator 23 is an insulating porous film that separates the positive electrode 21 and the negative electrode 22, prevents a short circuit due to contact with both electrodes each other, and allows permeation of lithium ions. The electrolyte solution is held in the pores of the separator 23, and therefore the separator 23 preferably has characteristics of high resistance to the electrolyte solution, low reactivity, and difficulty in expansion.

The separator 23 is composed of, for example, a porous film consisting of polytetrafluoroethylene, a polyolefin resin (for example, polypropylene (PP) or polyethylene (PE)), an acrylic resin, a styrene resin, a polyester resin, a nylon resin, or a resin obtained by blending these resins, and may have a structure in which two or more of these porous films are laminated.

Of these, a porous membrane consisting of polyolefin is preferable because of having an excellent short-circuit preventing effect and allowing improvement in the safety of the battery by a shutdown effect. Particularly, polyethylene is preferable as a material constituting the separator 23 because polyethylene can provide a shutdown effect within a range of 100° C. or more and 160° C. or less and is also excellent in electrochemical stability. Of these, low-density polyethylene, high-density polyethylene, and linear polyethylene are preferably used because of having an appropriate melting temperature and being easily available. In addition, there can be used a material obtained by copolymerizing or blending a resin having chemical stability with polyethylene or polypropylene. Alternatively, the porous membrane may have a structure of three or more layers in which a polypropylene layer, a polyethylene layer, and a polypropylene layer are sequentially laminated. The method for producing the separator 23 may be wet or dry.

A nonwoven fabric may be used as the separator 23. For example, aramid fibers, glass fibers, polyolefin fibers, polyethylene terephthalate (PET) fibers, or nylon fibers can be used as the fibers constituting the nonwoven fabric. In addition, two or more of these fibers may be mixed to be formed into a nonwoven fabric.

Electrolyte layer 24 includes an electrolyte solution, a polymer compound serving as a holding body that holds the electrolyte solution, and inorganic particles. The electrolyte layer 24 including inorganic particles can improve, for example, the strength, oxidation resistance, and heat resistance of the electrolyte layer 24. The electrolyte layer 24 preferably has a gel shape. The electrolyte layer 24 having a gel state can suppress liquid leakage of the battery, and provide a higher ionic conductivity than that of the solid electrolyte.

A case where both the electrolyte layer 24 provided between the positive electrode 21 and the separator 23 and the electrolyte layer 24 provided between the negative electrode 22 and the separator 23 include inorganic particles will be described; however, one of these electrolyte layers may include inorganic particles. However, from the viewpoint of improving battery characteristics, both of these electrolyte layers preferably include inorganic particles.

When one of the electrolyte layers formed on the positive electrode 21 and the negative electrode 22 includes inorganic particles, the electrolyte layer including inorganic particles has a structure with peripheral portion 124 and non-peripheral portion 24A described below. When both of the electrolyte layers formed on the positive electrode 21 and the negative electrode 22 include inorganic particles, at least one of the electrolyte layers of the positive electrode 21 and the negative electrode 22 has a structure with the peripheral portion 124 and the non-peripheral portion 24A. From the viewpoint of more effectively suppressing the leakage of the electrolyte solution from the electrolyte layer and improving the cycle characteristics of the battery, the peripheral portion 124 is preferably formed in the electrolyte layers 24 of both the positive electrode 21 and the negative electrode 22.

Figure 3A:
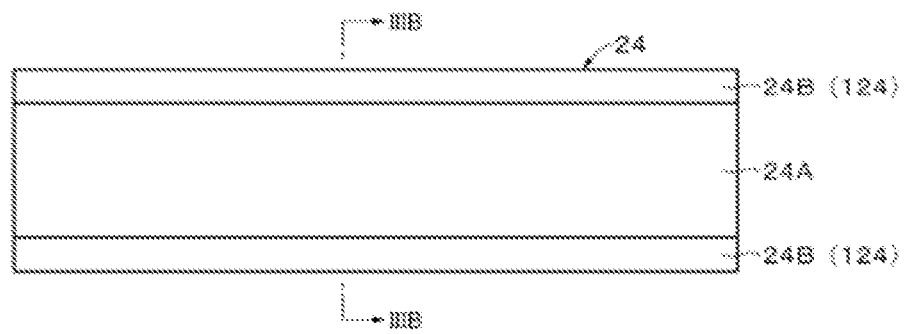
FIG. 3A is a plan view showing an example of a configuration of an electrolyte layer formed in a positive electrode according to an embodiment of the present disclosure.
Figure 3B:
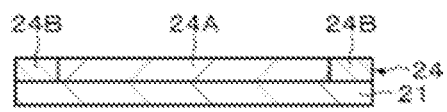
FIG. 3B is a sectional view taken along line IIIB-IIIB in FIG. 3A.
Figure 4:
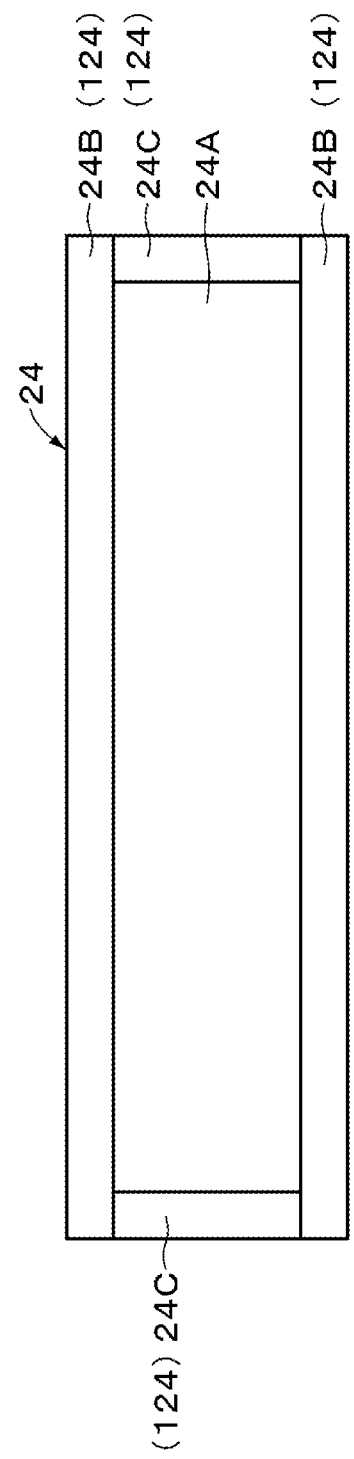
FIG. 4 is a plan view showing another example of a configuration of an electrolyte layer formed in a positive electrode according to an embodiment of the present disclosure.

As shown in FIG. 3A, FIG. 3B, and FIG. 4, the electrolyte layer 24 has the peripheral portion 124 and the non-peripheral edge portion 24A formed by a portion separated from the peripheral portion 124. FIG. 3A, FIG. 3B, and FIG. 4 shows an example in which the electrolyte layer 24 is formed in the positive electrode 21, and the same applies to a case where the electrolyte layer 24 is formed in the negative electrode 22.

In the electrolyte layer 24, the peripheral portion 124 is at least a portion formed along edges on a pair of non-short sides opposite to each other. Herein, the edge on the non-short side is specified as follows. When the electrolyte layer 24 is viewed with the thickness direction of the electrolyte layer 24 as the line-of-sight direction, the contour shape of the electrolyte layer 24 has a shape having a short direction and a longitudinal direction such as a rectangular shape or a band shape, or a square shape. However, the shape of the electrolyte layer 24 is a shape in a condition that the electrolyte layer 24 is not bent or wound. When the electrolyte layer 24 has a shape having a short direction and a longitudinal direction, the edges on a pair of non-short sides are specified as a pair of edges extending along the longitudinal direction of the electrolyte layer 24. In the examples of FIG. 3A, FIG. 3B, and FIG. 4, the edges on a pair of non-short sides correspond to the edges on a pair of long sides opposite to each other in the electrolyte layer 24. Therefore, the peripheral portion 124 in this case is composed of at least the peripheral portions 24B and 24B on the long sides that are portions along the edges on a pair of non-short sides in the electrolyte layer 24. When the electrolyte layer 24 has a square shape, the edges on a pair of non-short sides are specified as a combination of edges along each side constituting any one of two pairs of opposite sides of the electrolyte layer 24. In this case, the peripheral portion 124 is composed of at least a portion along the edges on a pair of sides opposite to each other in the electrolyte layer 24.

Non-peripheral portion 24A in the electrolyte layer 24 indicates another portion excluding a portion to be the peripheral portion 124 from the entire electrolyte layer 24, and is a portion excluding the peripheral portions 24B and 24B on the long side from the electrolyte layer 24 in the examples of FIG. 3A and FIG. 3B.

From the viewpoint of more effectively suppressing the leakage of the electrolyte solution from the electrolyte layer 24, the peripheral portion 124 is preferably formed along the entire peripheral edge of the electrolyte layer 24 as shown in FIG. 4. In the case of the example of FIG. 4, the peripheral portion 124 is formed not only in a portion along the edges on a pair of long sides but also in a portion along the edges on a pair of short sides (peripheral portion of short sides 24C and 24C). Therefore, as shown in the example of FIG. 4, the peripheral portion 124 is preferably composed of a portion in which the peripheral portions 24B and 24B on a pair of long sides and the peripheral portions 24C on a pair of short sides are combined. In this case, the non-peripheral portion 24A is specified as a portion excluding the peripheral portion 24B on the long sides and the peripheral portion 24C on the short sides from the electrolyte layer 24. The peripheral portion 124 may be composed of a portion along one of the peripheral portions 24B and 24B of the long sides and the edges on a pair of the short sides (peripheral portion 24C on the short sides).

In addition, it is preferable that the peripheral portion 124 is continuously formed along the edge of the electrolyte layer 24 as illustrated in FIG. 3A and FIG. 4; however, the present disclosure is not limited thereto, and the peripheral portion may have an interrupted portion. The width of the peripheral portion 124 is uniform in the examples of FIG. 3A and FIG. 4; however, is not limited thereto.

The peripheral portion 124 (24B, 24C) of the electrolyte layer 24 includes an electrolyte solution, a polymer compound that holds the electrolyte solution, and inorganic particles in a first composition. In the non-peripheral portion 24A, the electrolyte solution, the polymer compound that holds the electrolyte solution, and the inorganic particles are included in the second composition. The first composition represents a combination of each type and mass (component amount) of the electrolyte solution, the polymer compound, and the inorganic particles constituting the peripheral portion 124. The second composition represents a combination of each type and mass (component amount) of the electrolyte solution, the polymer compound, and the inorganic particles constituting the non-peripheral portion 24A. Each type of the electrolyte solution, the polymer compound, and the inorganic particles constituting the first composition and each type of the electrolyte solution, the polymer compound, and the inorganic particles constituting the second composition are selected to be the same.

The first composition and the second composition are determined so as to satisfy the following conditions.

In this case, the first composition and the second composition satisfy at least one of the following conditions 1 and 2.

Condition 1: A comparison value of Ain with Aout (Ain/Aout) is more than 1.

Condition 2: A comparison value of Bin with Bout (Bin/Bout) is less than 1.

In the first composition, the mass ratio of the electrolyte solution to the polymer compound is defined as Aout. In addition, the mass ratio of the inorganic particles to the polymer compound is defined as Bout. Furthermore, in the second composition, the mass ratio of the electrolyte solution to the polymer compound is Ain, and the mass ratio of the inorganic particles to the polymer compound is Bin.

From the viewpoint of reducing the leakage amount of the electrolyte solution from the electrolyte layer and suppressing the cycle deterioration of the battery due to the shortage of the electrolyte solution, the comparison value of Ain with Aout is preferably 1.1 or more, and more preferably 1.6 or more. From the same viewpoint, the comparison value of Bin with Bout is preferably 0.8 or less, and more preferably 0.6 or less.

The mass ratio of the electrolyte solution to the polymer compound (Aout, Ain) and the mass ratio of the inorganic particles to the polymer compound (Bout, Bin) for the first composition and the second composition can be specified by thermogravimetric/differential thermal analysis (TG-DTA).

The electrolyte solution, the polymer compound, and the inorganic particles constituting the first composition will be described below. The description of the electrolyte solution, the polymer compound, and the inorganic particles constituting the second composition is the same as the description of the electrolyte solution, the polymer compound, and the inorganic particles constituting the first composition.

The electrolyte solution is a so-called non-aqueous electrolyte solution, and includes an organic solvent (non-aqueous solvent) and an electrolyte salt dissolved in the organic solvent. The electrolyte solution may include a known additive in order to improve battery characteristics.

A cyclic carbonate ester such as ethylene carbonate or propylene carbonate can be used as the organic solvent, and one of ethylene carbonate and propylene carbonate, particularly a mixture of both are preferably used. This is because the cycle characteristics can be further improved.

In addition to these cyclic carbonate esters, a chain carbonate ester such as diethyl carbonate, dimethyl carbonate, ethyl methyl carbonate, or methyl propyl carbonate is preferably mixed and used as the organic solvent. This is because high ion conductivity can be obtained.

The organic solvent preferably further includes 2,4-difluoroanisole or vinylene carbonate. This is because 2,4-difluoroanisole can further improve the discharge capacity, and vinylene carbonate can further improve the cycle characteristics. Therefore, use of a mixture of these materials is preferable because the discharge capacity and the cycle characteristics can be further improved.

In addition to these, examples of the organic solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, or trimethyl phosphate.

A compound obtained by substituting at least a part of hydrogen in these organic solvents with fluorine may be preferable because the reversibility of the electrode reaction may be improved depending on the type of the electrode to be combined.

Examples of the electrolyte salt include lithium salts, and the electrolyte salt may be used singly, or may be used in mixture of two or more. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bisoxalate borate, or LiBr. Of these, $LiPF_6$ is preferable because high ion conductivity can be obtained and cycle characteristics can be further improved.

Examples of the polymer compound (first polymer compound) serving as a holding body for holding the electrolyte solution that can be used include at least one selected from the group consisting of vinylidene fluoride-based polymers, polyacrylonitrile, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. Particularly, from the viewpoint of electrochemical stability, of these polymer compounds, there is preferably used at least one selected from the group consisting of vinylidene fluoride-based polymers, polyacrylonitrile, polyhexafluoropropylene, and polyethylene oxide, and the vinylidene fluoride-based polymer is particularly preferably used. There is preferably used at least one selected from the group consisting of polyvinylidene fluoride (homopolymer of vinylidene fluoride) and a copolymer of vinylidene fluoride and hexafluoropropylene, as the vinylidene fluoride-based polymer. A part of, for example, the side chain or the terminal of the vinylidene fluoride-based polymer may be modified.

The inorganic particles include, for example, at least one of a metal oxide, a metal nitride, a metal carbide, and a metal sulfide. The metal oxide preferably includes at least one of aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), and yttrium oxide (yttria, $Y_2O_3$). The metal nitride preferably includes at least one of silicon nitride ($Si_3N_4$), aluminum nitride (AlN), boron nitride (BN), and titanium nitride (TiN). The metal carbide preferably includes at least one of, for example, silicon carbide (SiC) and boron carbide ($B_4C$). The metal sulfide preferably includes, for example, barium sulfate ($BaSO_4$). In addition, there may be included at least one of minerals such as porous aluminosilicate including zeolite ($M_{2/n}O \cdot Al_2O_3 \cdot xSiO_2 \cdot yH_2O$, M is a metal element, $x \geq 2$, $y \geq 0$), layered silicate, barium titanate ($BaTiO_3$), and strontium titanate ($SrTiO_3$). Of these, there is preferably included at least one of alumina, titania (particularly having a rutile structure), silica, and magnesia, and alumina is more preferably included. The inorganic particles have oxidation resistance and heat resistance, and the particle-containing layer 23A on the side surface facing the positive electrode containing the inorganic particles has strong resistance to an oxidation environment in the vicinity of the positive electrode during charging. The shape of the inorganic particles is not particularly limited, and any of spherical, plate, fibrous, cubic, and random shapes can be used.

The average particle size of the inorganic particles is preferably 1 nm or more and 1 µm or less. The inorganic particles having an average particle size of less than 1 nm are hardly available, and the availability thereof needs high cost. Whereas, the inorganic particles having an average particle size of 1 µm or less can improve the coatability of the coating material for forming the electrolyte layer, and further suppress the variation in the inorganic particle concentration in the electrolyte layer 24.

In the battery having the above-described configuration, when charging is performed, for example, lithium ions are released from positive electrode active material layer 21B and occluded in negative electrode active material layer 22B with electrolyte layer 24 interposed therebetween. In addition, when discharging is performed, for example, lithium ions are released from the negative electrode active material layer 22B and occluded in the positive electrode active material layer 21B with the electrolyte layer 24 interposed therebetween.

Then, an example of a method for producing the battery according to an embodiment of the present disclosure will be described.

Positive electrode 21 is produced as follows. For example, a positive electrode mixture is prepared by mixing a positive electrode active material, a binder, and a conductive agent, and this positive electrode mixture is dispersed in a solvent such as N-methyl-2-pyrrolidone (NMP) to produce a paste-like positive electrode mixture slurry. Then, this positive electrode mixture slurry is applied to both surfaces of positive electrode current collector 21A, the solvent is dried, and compression molding is performed by, for example, a roll press machine to form positive electrode active material layer 21B, thereby providing the positive electrode 21.

Negative electrode 22 is produced as follows. For example, a negative electrode mixture was prepared by mixing a negative electrode active material and a binder, and this negative electrode mixture is dispersed in a solvent such as N-methyl-2-pyrrolidone to produce a paste-like negative electrode mixture slurry. Then, this negative electrode mixture slurry is applied to both surfaces of negative electrode current collector 22A, the solvent is dried, and compression molding is performed by, for example, a roll press machine to form negative electrode active material layer 22B, thereby providing negative electrode 22.

Electrolyte layer 24 is produced as follows. A solution for forming a peripheral portion and a solution for forming a non-peripheral portion are obtained. The solution for forming a peripheral portion can be obtained as follows. An electrolyte solution as a constituent component of the peripheral portion, a polymer compound serving as a holding body that holds the electrolyte solution, inorganic particles, and an organic solvent are mixed to provide a mixed solution. This mixed solution is heated and stirred by using, for example, a homogenizer. Then, the polymer compound in the mixed solution is dissolved. This makes it possible to prepare a sol-like precursor solution in which inorganic particles are dispersed. The solution for forming a non-peripheral portion can be prepared by performing the same step as the solution for forming a peripheral portion.

The masses of the electrolyte solution included in the solution for forming a peripheral portion, the polymer compound serving as a holding body that holds the electrolyte solution, and the inorganic particles are selected previously in such an amount that the mass compositions of the electrolyte solution in the peripheral portion, the polymer compound, and the inorganic particles become the first composition. The masses of the electrolyte solution included in the solution for forming a non-peripheral portion, the polymer compound serving as a holding body that holds the electrolyte solution, and the inorganic particles are selected previously in such an amount that the mass compositions of the electrolyte solution in the peripheral portion, the polymer compound, and the inorganic particles become the second composition.

A solution for forming a peripheral portion and a solution for forming a non-peripheral portion are applied and impregnated in predetermined regions on both surfaces of positive electrode 21 and negative electrode 22, respectively. When applying the solution for forming a peripheral portion, masking is performed previously by using, for example, a polypropylene film in a region corresponding to non-peripheral portion 24A on both surfaces of the positive electrode 21 and the negative electrode 22, and the solution for forming a peripheral portion is applied to a non-masking region. When applying the solution for forming a non-peripheral portion, masking is performed previously by using, for example, a polypropylene film in a region corresponding to peripheral portion 124 on both surfaces of the positive electrode 21 and the negative electrode 22, and the solution for forming a non-peripheral portion is applied to a non-masking region.

A solution for forming a peripheral portion and a solution for forming a non-peripheral portion are applied to predetermined regions on both surfaces of positive electrode 21 and negative electrode 22, and then the solution for forming a peripheral portion and the solution for forming a non-peripheral portion are dried to be formed into electrolyte layer 24 having peripheral portion 124 and non-peripheral portion 24A. In the example of FIG. 2, the electrolyte layer 24 is formed on the formation portion of positive electrode active material layer 21B of the positive electrode 21, and is formed on the formation portion of negative electrode active material layer 22B of the negative electrode 22. The electrolyte layer 24 may be formed over the entire surface of the positive electrode 21 and the entire surface of the negative electrode 22.

Electrode assembly 20 is produced as follows. Positive electrode lead 11 is attached to the end portion of positive electrode current collector 21A by welding, and negative electrode lead 12 is attached to the end portion of negative electrode current collector 22A by welding. Then, positive electrode 21 and negative electrode 22 with electrolyte layer 24 formed are laminated with the separator 23 interposed therebetween to form a laminate, and then this laminate is wound in the longitudinal direction, and protective tape 25 is adhered to the outermost peripheral portion to provide the electrode assembly 20.

Electrode assembly 20 is sealed by exterior material 10 as follows. For example, electrode assembly 20 is sandwiched between flexible exterior materials 10. Then, adhesive film 13 is inserted between positive electrode lead 11 and negative electrode lead 12 and the exterior material 10. The adhesive film 13 may be previously attached to each of the positive electrode lead 11 and the negative electrode lead 12. In addition, the exterior material 10 may be previously embossed to form a recess as an accommodation space for accommodating the electrode assembly 20. Then, the outer peripheral portions of the exterior material 10 are brought into close contact with each other by, for example, heat fusion and sealed. As described above, there is obtained a battery in which the electrode assembly 20 is accommodated by the exterior material 10. After sealing, the battery may be molded by heat pressing as necessary.

For peripheral portion 124 and non-peripheral portion 24A of electrolyte layer 24, the peripheral portion 124 includes an electrolyte solution, a polymer compound that holds the electrolyte solution, and inorganic particles in the first composition, and non-peripheral portion 24A includes an electrolyte solution, a polymer compound, and inorganic particles in the second composition. The mass ratio of the electrolyte solution to the polymer compound in the first composition is defined as Aout, and the mass ratio of the inorganic particles to the polymer compound is defined as Bout. Furthermore, the mass ratio of the electrolyte solution to the polymer compound in the second composition is defined as Ain, and the mass ratio of the inorganic particles to the polymer compound is defined as Bin. In this case, the first composition and the second composition satisfy at least one of the conditions 1 and 2 described above, allowing suppression of the leakage of the electrolyte solution from the electrolyte layer 24 without providing a new electrode member around the electrolyte layer 24. This suppresses the deterioration of the cycle characteristics of the battery due to the shortage of the electrolyte solution caused by the leakage of the electrolyte solution. Furthermore, it is possible to suppress the possibility of a decrease in energy density due to the addition of a new electrode member.

In the second embodiment, an electronic device including the battery according to the first embodiment will be described.

Figure 5:
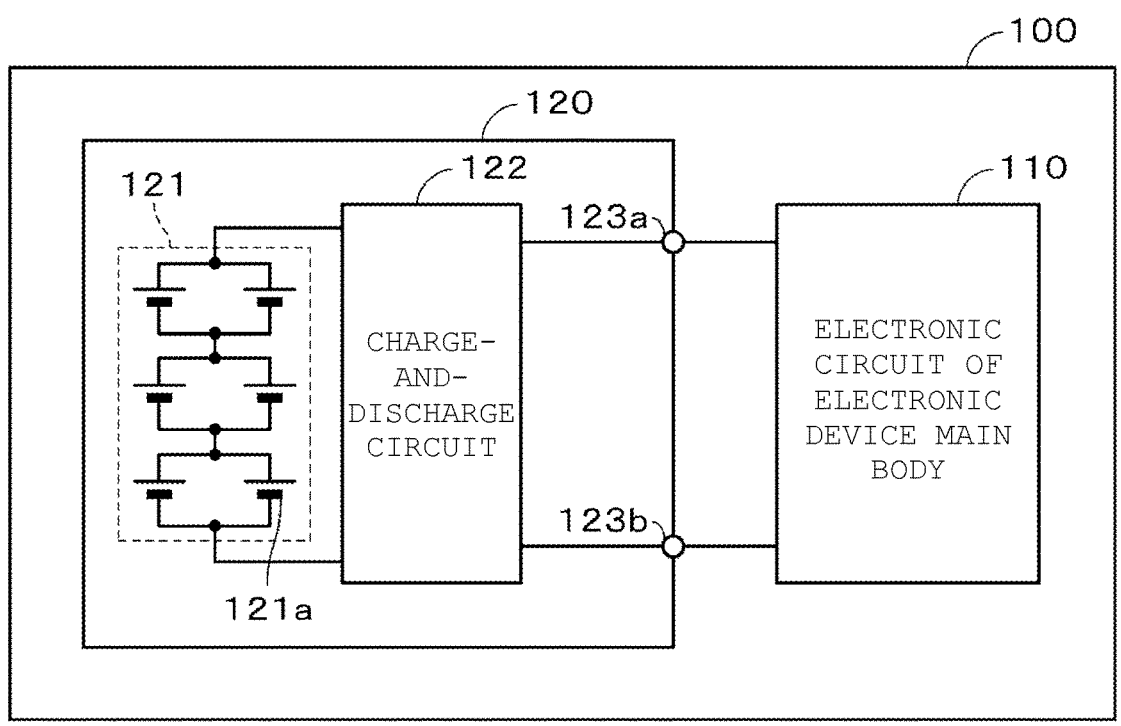
FIG. 5 is a block diagram showing an example of a configuration of an electronic device according to an embodiment of the present disclosure.

FIG. 5 shows an example of a configuration of electronic device 100 according to the second embodiment of the present disclosure. The electronic device 100 includes electronic circuit 110 of an electronic device main body and battery pack 120. The battery pack 120 is electrically connected to the electronic circuit 110 with positive electrode terminal 123a and negative electrode terminal 123b interposed therebetween. The electronic device 100 may have a configuration in which the battery pack 120 is detachable.

Examples of electronic device 100 include notebook personal computers, tablet computers, mobile phones (for example, smartphones), personal digital assistants (PDA), display devices (LCD (Liquid Crystal Display), EL (Electro Luminescence) display, electronic paper, imaging devices (for example, a digital still camera, a digital video camera), audio devices (for example, portable audio players), game devices, cordless phone handsets, electronic books, electronic dictionaries, radios, headphones, navigation systems, memory cards, pacemakers, hearing aids, electric tools, electric shavers, refrigerators, air conditioners, televisions, stereos, water heaters, microwave ovens, dishwashers, washing machines, dryers, lighting devices, toys, medical devices, robots, road conditioners, or traffic lights; however, are not limited to these.

Electronic circuit 110 includes, for example, a central processing unit (CPU), a peripheral logic unit, an interface unit, and a storage unit, and controls entire electronic device 100.

Battery pack 120 includes assembled battery 121 and charge-and-discharge circuit 122. The battery pack 120 may further include an exterior member (not shown) that accommodates the assembled battery 121 and the charge-and-discharge circuit 122 as necessary.

Assembled battery 121 is composed of connection of a plurality of secondary batteries 121a in series and/or in parallel. The plurality of secondary batteries 121a are connected in, for example, n parallel m series (n and m are positive integers). FIG. 5 shows an example in which six secondary batteries 121a are connected in 2 parallel 3 series (2P3S). The battery according to the first embodiment described above is used as the secondary battery 121a.

Herein, there will be described a case where battery pack 120 includes assembled battery 121 including the plurality of secondary batteries 121a; however, there may be adopted a configuration in which the battery pack 120 includes one secondary battery 121a instead of the assembled battery 121.

Charge-and-discharge circuit 122 is a control unit that controls charge and discharge of assembled battery 121. Specifically, at the time of charging, the charge-and-discharge circuit 122 controls charging for the assembled battery 121. Whereas, at the time of discharging (that is, at the time of using electronic device 100), the charge-and-discharge circuit 122 controls discharging for the electronic device 100.

A case composed of, for example, a metal, a polymer resin, or a composite material thereof can be used as the exterior material. Examples of the composite material include a laminate in which a metal layer and a polymer resin layer are laminated.

The chemical formulas of, for example, the compounds exemplified in each embodiment are representative, and are not limited to, for example, the described valences as long as the compounds have common names of the same compounds. In addition, in the numerical range described in stages in the above embodiment, the upper limit value or the lower limit value of the numerical range in a certain stage may be replaced with the upper limit value or the lower limit value of the numerical range in another stage. In addition, the materials exemplified in the above-described embodiments can be used singly or in combination of two or more unless otherwise specified.

In addition, in the above embodiment, the laminate battery has been described as an example; however, the shape of the battery is not limited thereto, and the present disclosure can also be applied to batteries having various shapes such as a cylindrical shape, a square shape, a coin shape, or a button shape. In addition, the present disclosure can be applied to, for example, a flexible battery mounted on a wearable terminal such as a smart watch and a head mounted display.

In addition, in the above-described embodiment, an example in which the present disclosure is applied to a wound battery has been described; however, the structure of the battery is not limited thereto, and the present disclosure is also applicable to, for example, a laminated battery (stacked battery) in which a positive electrode and a negative electrode are laminated with a separator interposed therebetween, or a battery in which a positive electrode and a negative electrode are folded with a separator interposed therebetween.

EXAMPLES

Hereinafter, the present disclosure will be specifically described with reference to examples; however, the present disclosure is not limited only to these examples.

Examples 1 to 4 and 9 to 13, and Comparative Examples 1 to 3

(Step of Producing Positive Electrode)

96 parts by mass of $LiCoO_2$ as a positive electrode active material, 3 parts by mass of polyvinylidene fluoride (PVdF)

as a positive electrode binder, and 1 part by mass of carbon black as a positive electrode conductive agent were mixed to provide a positive electrode mixture. Then, the positive electrode mixture was dispersed in an organic solvent (N-methyl-2-pyrrolidone) to provide a paste-like positive electrode mixture slurry. Then, the positive electrode mixture slurry was applied to both surfaces of a positive electrode current collector (15 μm-thick aluminum foil) by using a coating apparatus, and then the positive electrode mixture slurry was dried to be formed into a positive electrode active material layer. Then, the positive electrode active material layer was compression-molded by using a roll press machine, and then the positive electrode current collector with the positive electrode active material layer formed was cut into a strip shape of 48 mm×300 mm.

(Step of Producing Negative Electrode)

90 parts by mass of artificial graphite as a negative electrode active material and 10 parts by mass of polyvinylidene fluoride (PVdF) as a negative electrode binder were mixed to provide a negative electrode mixture. Then, the negative electrode mixture was dispersed in an organic solvent (N-methyl-2-pyrrolidone) to provide a paste-like negative electrode mixture slurry. Then, the negative electrode mixture slurry was applied to both surfaces of a negative electrode current collector (15 μm-thick copper foil) by using a coating apparatus, and then the negative electrode mixture slurry was dried to be formed into a negative electrode active material layer. Then, the negative electrode active material layer was compression-molded by using a roll press machine, and then the negative electrode current collector with the negative electrode active material layer formed was cut into a strip shape of 50 mm×310 mm.

(Preparation of Solution for Forming Non-peripheral Portion and Solution for Forming Peripheral Portion)

Ethylene carbonate (EC) and propylene carbonate (PC) were mixed at a mass ratio of EC:PC=50:50 to prepare a mixed solvent. Then, an electrolyte salt (LiPF$_6$) was dissolved in the mixed solvent so as to be 1 mol/kg to prepare an electrolyte solution. Then, 32.5 parts by mass of the electrolyte solution, 2 parts by mass of polyvinylidene fluoride (PVdF) as a polymer compound, 0.5 parts by mass of alumina particles as inorganic particles, and 65 parts by mass of dimethyl carbonate as an organic solvent were mixed to provide a mixed solution. The mixed solution was heated and stirred (80° C., stirring time for 30 minutes to 1 hour) by using a homogenizer to dissolve the polymer compound, thereby preparing a sol-like precursor solution to be a solution for forming a non-peripheral portion.

The mixed solution to be the solution for forming a peripheral portion was obtained by using the same compound species and method as the method for obtaining the solution for forming a non-peripheral portion. However, the mass of each compound species used to obtain the solution for forming a peripheral part was selected previously in such an amount that the comparison value of Ain with Aout (Ain/Aout) and the comparison value of Bin with Bout (Bin/Bout), which are the comparison values of the mass ratios regarding the first composition and the second composition, were values shown in Table 1. The first composition was a combination of each compound species constituting the peripheral portion of the electrolyte layer and each mass thereof, and the second composition was a combination of each compound species constituting the non-peripheral portion of the electrolyte and each mass thereof. Herein, both the first composition and the second composition were compositions after the gel-like electrolyte layer was formed.

In the first composition, the mass ratio of the electrolyte solution to the polymer compound was Aout. In addition, the mass ratio of the inorganic particles to the polymer compound was Bout. In the second composition, the mass ratio of the electrolyte solution to the polymer compound was Ain. In addition, the mass ratio of the inorganic particles to the polymer compound was Bin.

The mass ratio of the electrolyte solution to the polymer compound and the mass ratio of the inorganic particles to the polymer compound for each of the first composition and the second composition were determined by thermogravimetric/differential thermal analysis (TG-DTA). The sampling amount of the gel-like electrolyte was 5 to 10 mg.

After masking the region corresponding to the peripheral portion of the surface of the positive electrode, a solution for forming a non-peripheral portion was applied to the region corresponding to the non-peripheral portion, and the solution for forming the non-peripheral portion was dried. In addition, after masking the region corresponding to the non-peripheral portion of the surface of the positive electrode, a solution for forming a peripheral portion was applied to the region corresponding to the peripheral portion, and then the solution for forming the peripheral portion was dried. As a result, a gel-like electrolyte layer was formed in a predetermined region of the surface of the positive electrode. Then, the electrolyte layer was formed over the entire region in the width direction of the positive electrode. Similarly, a gel-like electrolyte layer was formed on the surface of the negative electrode. Both edge portions (peripheral portions on the long side) along the long side direction of the electrolyte layer were selected as the peripheral portion. The width of the peripheral portion on the long side was determined as follows. For a negative electrode having a width of 50 mm×a length of 310 mm, a portion having a width of 7.5 mm from an edge of each of a pair of long sides opposite to each other was defined as the peripheral portion on the long side. Then, a portion having a width of 35 mm inside the side edge of the electrolyte layer within a width of 50 mm was defined as the non-marginal portion. For a positive electrode having a width of 48 mm×a length of 310 mm, a portion having a width of 7.5 mm from an edge of each of a pair of long sides opposite to each other was defined as the peripheral portion on the long side. Then, a portion having a width of 33 mm inside the side edge of the electrolyte layer within a width of 48 mm was defined as the non-marginal portion.

The ionic conductivities of the non-peripheral portion and the peripheral portion were 0.1 mS/cm or more at 23° C., and both the non-peripheral portion and the peripheral portion were confirmed to function as an electrolyte.

(Step of Winding)

A positive electrode lead was welded to the positive electrode current collector, and a negative electrode lead was welded to the negative electrode current collector. Then, the positive electrode with the electrolyte layer (positive electrode-side electrolyte layer) formed and the negative electrode with the electrolyte layer (negative electrode-side electrolyte layer) formed were laminated with the separator (microporous polypropylene film having a thickness of 11 μm) interposed therebetween, and then the laminate was wound in the longitudinal direction, and a protective tape was attached to the outermost peripheral portion of the wound body to provide a wound electrode assembly.

(Step of Sealing)

An exterior material was folded so that the electrode assembly was sandwiched between flexible exterior materials. Then, an adhesive film was inserted between the positive electrode lead and the exterior material, and an adhesive film was inserted between the negative electrode lead and the exterior material. Then, the outer peripheral portions of the folded exterior material were heat-sealed to enclose the electrode assembly in the exterior material. As described above, an intended battery was obtained.

Example 5

A battery was obtained in the same manner as in Example 2 except that both edge portions along the short side direction of the electrolyte layer were used as peripheral portions (peripheral portions on the short side) in addition to the peripheral portions on the long side.

The peripheral portion on the short side was defined as follows. For both the negative electrode and the positive electrode, a portion having a width of 7.5 mm from an edge of each of both short sides of the electrolyte layer was defined as the peripheral portion on the short side.

Example 6

A battery was obtained in the same manner as in Example 5 except that the positive electrode current collector was cut into a size of 48 mm in width×68 mm in length, the negative electrode current collector was cut into a size of 50 mm in width×70 mm in length, and the electrode assembly was made into a laminated type in the following step of lamination.
(Step of Lamination)

A positive electrode with an electrolyte layer (positive electrode-side electrolyte layer) formed and a negative electrode with an electrolyte layer (negative electrode-side electrolyte layer) formed were alternately laminated with a separator (11 µm-thick microporous polypropylene film) interposed therebetween, and then a protective tape was attached to the outermost peripheral portion of the laminated body to provide a laminated electrode assembly. In the electrode assembly, a positive electrode lead was welded to the positive electrode current collector, and a negative electrode lead was welded to the negative electrode current collector.

Example 7

A battery was obtained in the same manner as in Example 2 except that the electrolyte layer was formed by forming the peripheral portion only in the positive electrode and the non-peripheral portion only on the surface of the negative electrode.

Example 8

A battery was obtained in the same manner as in Example 2 except that the electrolyte layer was formed by forming the peripheral portion only in the negative electrode and the non-peripheral portion only on the surface of the positive electrode.

Comparative Example 4

A battery was obtained in the same manner as in Comparative Example 1 except that the positive electrode current collector was cut into a size of 48 mm in width×68 mm in length, the negative electrode current collector was cut into a size of 50 mm in width×70 mm in length, and the electrode assembly was made into a laminated type in the same step of lamination as in Example 6.
(Charge-and-Discharge Cycle Test at 23° C.)

Using each of the batteries produced in Examples 1 to 13 and Comparative Examples 1 to 4, the following charge-and-discharge cycle test was performed. In the charge-and-discharge cycle test, charge-and-discharge at 0.1/0.1 C (both charging and discharging of the battery were performed under the condition of 0.1 C) was performed for one cycle. Then (for the second and subsequent cycles), charge-and-discharge at 1.0/1.0 C (both charging and discharging of the battery were performed at 1.0 C conditions) was performed, and the capacity retention rate (%) was calculated. The capacity retention ratio was identified by comparing the discharge capacity (discharge capacity at the 500th cycle) identified in the charge-and-discharge cycle test at the 500th cycle with the discharge capacity (discharge capacity at the 2nd cycle) identified in the charge-and-discharge cycle test at the 2nd cycle. Specifically, the capacity retention rate was obtained as a value calculated by [(discharge capacity at 500th cycles)/(discharge capacity at 2nd cycles)]×100.

Table 1 shows the configurations and evaluation results of the batteries of Examples 1 to 13 and Comparative Examples 1 to 4.

TABLE 1

| | Comparison value of mass ratio (the second composition/ the first composition) | | | Portion composed of the first composition in electrolyte layer | | Structure type of electrode assembly |
|---|---|---|---|---|---|---|
| | Electrolyte solution/ polymer compound | Inorganic particles/ polymer compound | Capacity retention ratio [%] | Positive electrode | Negative electrode | |
| Example 1 | 1.11 | 1.00 | 83 | Peripheral portion on long side | Peripheral portion on long side | Wound |
| Example 2 | 1.67 | 1.00 | 84 | Peripheral portion on long side | Peripheral portion on long side | Wound |
| Example 3 | 3.00 | 1.00 | 80 | Peripheral portion on long side | Peripheral portion on long side | Wound |
| Example 4 | 5.00 | 1.00 | 82 | Peripheral portion on long side | Peripheral portion on long side | Wound |
| Example 5 | 1.67 | 1.00 | 81 | Peripheral portion on long side, and peripheral portion on short side | Peripheral portion on long side, and peripheral portion on short side | Wound |

TABLE 1-continued

| | Comparison value of mass ratio (the second composition/ the first composition) | | | Portion composed of the first composition in electrolyte layer | | |
|---|---|---|---|---|---|---|
| | Electrolyte solution/ polymer compound | Inorganic particles/ polymer compound | Capacity retention ratio [%] | Positive electrode | Negative electrode | Structure type of electrode assembly |
| Example 6 | 1.67 | 1.00 | 85 | Peripheral portion on long side, and peripheral portion on short side | Peripheral portion on long side, and peripheral portion on short side | Laminated |
| Example 7 | 1.67 | 1.00 | 75 | Peripheral portion on long side | — | Wound |
| Example 8 | 1.67 | 1.00 | 73 | — | Peripheral portion on long side | Wound |
| Example 9 | 1.00 | 0.73 | 80 | Peripheral portion on long side | Peripheral portion on long side | Wound |
| Example 10 | 1.00 | 0.50 | 81 | Peripheral portion on long side | Peripheral portion on long side | Wound |
| Example 11 | 1.00 | 0.20 | 83 | Peripheral portion on long side | Peripheral portion on long side | Wound |
| Example 12 | 1.00 | 0.04 | 80 | Peripheral portion on long side | Peripheral portion on long side | Wound |
| Example 13 | 1.67 | 0.20 | 82 | Peripheral portion on long side | Peripheral portion on long side | Wound |
| Comparative Example 1 | 1.00 | 1.00 | 68 | Peripheral portion on long side | Peripheral portion on long side | Wound |
| Comparative Example 2 | 0.50 | 1.00 | 44 | Peripheral portion on long side | Peripheral portion on long side | Wound |
| Comparative Example 3 | 1.00 | 2.00 | 56 | Peripheral portion on long side | Peripheral portion on long side | Wound |
| Comparative Example 4 | 1.00 | 1.00 | 74 | Peripheral portion on long side | Peripheral portion on long side | Laminated |

According to Examples 1 to 4 and Comparative Examples 1 and 2, the peripheral portion having the first composition and the non-peripheral portion having the second composition are formed in the electrolyte layer, and the comparison value of the mass ratio of the electrolyte solution/the polymer compound is adjusted for the first composition and the second composition, whereby the reduction in the capacity retention ratio is suppressed. This is considered to be because the leakage of the electrolyte solution from the electrolyte layer is suppressed and the possibility of shortage of the electrolyte solution is suppressed.

According to Example 6 and Comparative Examples 1, 4, and the like, when the lengths of the long side and the short side of the electrode are close as in the case of a laminated battery, the peripheral portion is formed around the entire periphery of the electrolyte layer, whereby the capacity retention rate is further improved.

According to Examples 7 and 8, Comparative Example 1, and Example 1, the effect of increasing the capacity retention ratio was able to be confirmed only by forming the peripheral portion only on the positive electrode side or only on the negative electrode side.

According to Examples 10 to 12 and Comparative Examples 1 and 3, the peripheral portion having the first composition and the non-peripheral portion having the second composition are formed in the electrolyte layer, and the comparison value of the mass ratio of the inorganic particles/ the polymer compound is adjusted for the first composition and the second composition, whereby the reduction in the capacity retention ratio is suppressed.

According to Example 13, Comparative Example 1, and Example 1, the peripheral portion having the first composition and the non-peripheral portion having the second composition are formed in the electrolyte layer, and both the comparison value of the mass ratio of the electrolyte solution/the polymer compound and the comparison value of the mass ratio of the inorganic particles/the polymer compound are adjusted for the first composition and the second composition, whereby the decrease in the capacity retention ratio is suppressed.

The embodiments and examples of the present disclosure have been specifically described above, the present disclosure is not limited to the above-described embodiments and examples, and various modifications based on the technical idea of the present disclosure are possible.

For example, the configurations, methods, steps, shapes, materials, and numerical values described in the above-described embodiments and examples are merely examples, and different configurations, methods, steps, shapes, materials, and numerical values may be used as necessary. In addition, for example, the configurations, methods, steps, shapes, materials, and numerical values of the above-described embodiments and examples can be combined with each other without departing from the gist of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising a positive electrode, a negative electrode, and an electrolyte layer,
the electrolyte layer having at least a peripheral portion provided along edges on a pair of non-short sides opposite to each other and a non-peripheral portion provided by a portion separated from the peripheral portion,
the peripheral portion including an electrolyte solution, a polymer compound that holds the electrolyte solution, and inorganic particles in a first composition,
the non-peripheral portion including the electrolyte solution, the polymer compound, and the inorganic particles in a second composition, and
the first composition and the second composition satisfying a condition 2,
wherein a mass ratio of the inorganic particles to the polymer compound in the first composition is defined as Bout,
wherein a mass ratio of the inorganic particles to the polymer compound in the second composition is defined as Bin,
wherein:
the condition 2: a ratio of Bin to Bout is less than 1, and
wherein the non-peripheral portion is disposed between edges of the peripheral portion adjacent to each other in a first direction perpendicular to a direction in which the positive electrode, an electrolyte layer, and a negative electrode are stacked.

2. The battery according to claim 1, wherein the peripheral portion is provided along an entire peripheral edge of the electrolyte layer.

3. The battery according to claim 1, wherein the electrolyte layer is provided on surfaces of the positive electrode and the negative electrode.

4. The battery according to claim 2, wherein the electrolyte layer is provided on surfaces of the positive electrode and the negative electrode.

5. The battery according to claim 1, wherein the positive electrode includes a positive electrode current collector and a positive electrode active material layer provided on both sides of the positive electrode current collector.

6. The battery according to claim 1, wherein the negative electrode includes negative electrode current collector and a negative electrode active material layer provided on both sides of the negative electrode current collector.

7. The battery according to claim 1, wherein the battery further includes a separator, and wherein the separator includes an insulating porous film.

8. The battery according to claim 1, wherein the electrolyte layer has a gel shape.

9. The battery according to claim 1, wherein the inorganic particles include at least one of a metal oxide, a metal nitride, a metal carbide, or a metal sulfide.

10. An electronic device comprising:
an electronic circuit; and
the battery according to claim 1.

11. The battery according to claim 1, wherein the ratio of Bin to Bout is equal to or less than 0.73.

12. The battery according to claim 1, wherein the battery is a laminated battery.

13. The battery according to claim 12, wherein the laminated battery includes: a wound electrode assembly with the positive electrode and the negative electrode attached thereto.

14. The battery according to claim 9, wherein the inorganic particles include alumina.

15. A battery comprising a positive electrode, a negative electrode, and an electrolyte layer,
the electrolyte layer having at least a peripheral portion provided along edges on a pair of non-short sides opposite to each other and a non-peripheral portion provided by a portion separated from the peripheral portion,
the peripheral portion including an electrolyte solution, a polymer compound that holds the electrolyte solution, and inorganic particles in a first composition,
the non-peripheral portion including the electrolyte solution, the polymer compound, and the inorganic particles in a second composition, and
the first composition and the second composition satisfying a condition 1 and a condition 2,
wherein a mass ratio of the electrolyte solution to the polymer compound in the first composition is defined as Aout, and a mass ratio of the inorganic particles to the polymer compound in the first composition is defined as Bout,
wherein a mass ratio of the electrolyte solution to the polymer compound in the second composition is defined as Ain, and a mass ratio of the inorganic particles to the polymer compound in the second composition is defined as Bin,
wherein:
the condition 1: a ratio of Ain to Aout is more than 1,
the condition 2: a ratio of Bin to Bout is less than 1, and
wherein the non-peripheral portion is disposed between edges of the peripheral portion adjacent to each other in a first direction perpendicular to a direction in which the positive electrode, an electrolyte layer, and a negative electrode are stacked.

16. The battery according to claim 15, wherein the ratio of Ain to Aout is equal to or greater than 1.11.

17. The battery according to claim 15, wherein the ratio of Ain to Aout is equal to or greater than 1.67.

18. A battery comprising a positive electrode, a negative electrode, and an electrolyte layer,
the electrolyte layer having at least a peripheral portion provided along edges on a pair of non-short sides opposite to each other and a non-peripheral portion provided by a portion separated from the peripheral portion,
the peripheral portion including an electrolyte solution, a polymer compound that holds the electrolyte solution, and inorganic particles in a first composition,
the non-peripheral portion including the electrolyte solution, the polymer compound, and the inorganic particles in a second composition, and
the first composition and the second composition satisfying a condition 1 and a condition 2,
wherein a mass ratio of the electrolyte solution to the polymer compound in the first composition is defined as Aout, and a mass ratio of the inorganic particles to the polymer compound in the first composition is defined as Bout,
wherein a mass ratio of the electrolyte solution to the polymer compound in the second composition is defined as Ain, and a mass ratio of the inorganic particles to the polymer compound in the second composition is defined as Bin, and
wherein
the condition 1: a ratio of Ain to Aout is more than 1, and
the condition 2: a ratio of Bin to Bout is less than 1.

* * * * *